United States Patent [19]

Burrows et al.

[11] Patent Number: 5,001,718
[45] Date of Patent: Mar. 19, 1991

[54] TELESCOPIC THERMAL LENS COMPENSATING LASER

[75] Inventors: Graham Burrows, Rugby; James M. Burch, Weybridge, both of United Kingdom

[73] Assignee: Lumonics, Ltd., Rugby, England

[21] Appl. No.: 529,481

[22] Filed: May 29, 1990

[30] Foreign Application Priority Data

Jun. 2, 1989 [GB] United Kingdom ............... 8912765

[51] Int. Cl.[5] .............................................. H01S 3/13
[52] U.S. Cl. ......................................... 372/33; 372/31; 372/68; 372/101
[58] Field of Search ............... 372/33, 9, 29, 31, 98, 372/101, 68

[56] References Cited

U.S. PATENT DOCUMENTS

| 3,609,584 | 9/1971 | Stitch et al. | 372/33 X |
| 3,628,180 | 12/1971 | Segre | 372/33 |
| 3,798,571 | 3/1974 | Segre | 372/33 |
| 4,021,754 | 5/1977 | Colao | 372/33 X |
| 4,731,788 | 3/1988 | Shoshan | 372/9 |
| 4,858,239 | 8/1989 | Shoshan | 372/9 |
| 4,949,358 | 8/1990 | Kantorski et al. | 372/94 |
| 4,955,725 | 9/1990 | Johnson et al. | 372/22 |

FOREIGN PATENT DOCUMENTS 0339868 11/1989 European Pat. Off. .

Primary Examiner—Frank Gonzalez
Assistant Examiner—Galen J. Hansen
Attorney, Agent, or Firm—Nixon & Vanderhye

[57] ABSTRACT

In order to compensate for the thermally induced lens in the active element of an optical stage of a laser, the optical stage is provided with a telescope. The telescope comprises first and second lens arrangement. The first lens arrangement is located at one of its focal planes. The position of the second lens arrangement is adjusted so as to compensate for variations in the power of flashlamps which pump the active element. In one embodiment, the laser has an oscillator stage and an amplifier stage. The telescope is placed after the oscillator stage and comprises two convex lenses.

11 Claims, 6 Drawing Sheets

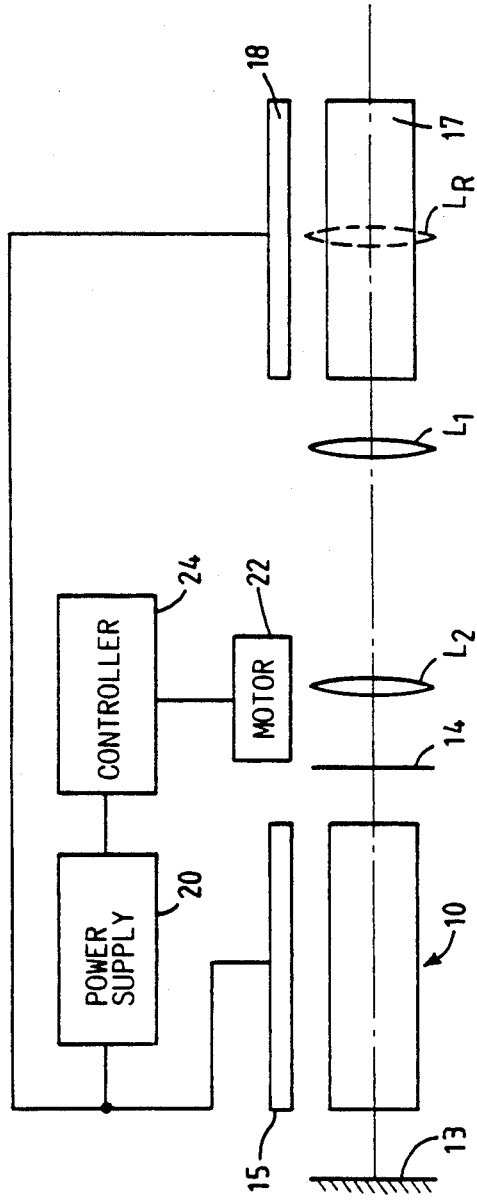
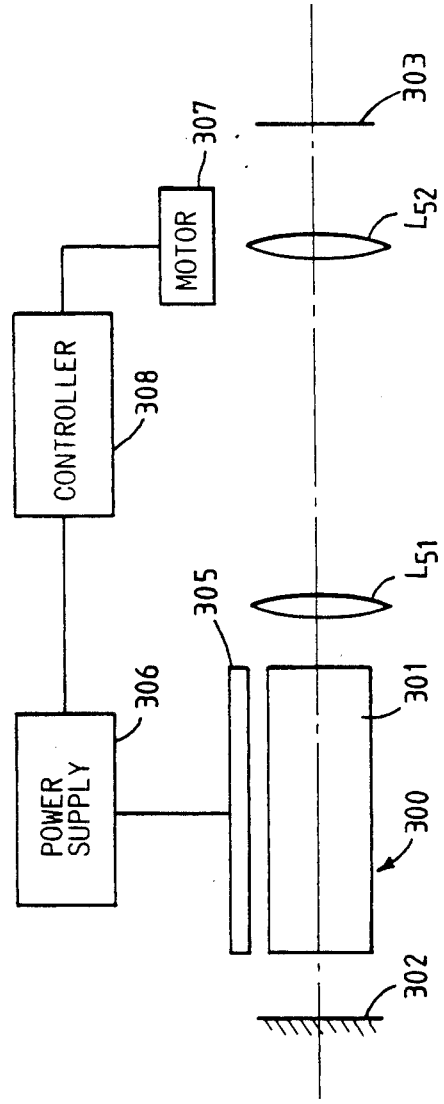
FIG. 6
FIG. 8

TELESCOPIC THERMAL LENS COMPENSATING LASER

BACKGROUND OF THE INVENTION

This invention relates to a laser having at least one optical stage.

In a conventional laser there is a single optical stage and this is the oscillator stage. The oscillator stage has an active element formed from active material and means for pumping the active material. Under the influence of the associated pumping means, the active element suffers from a lens effect and this lens effect arises for the following reason. Most of the light supplied by the pumping means and incident on the active element is dissipated in the active element thereby causing the temperature of the active element to rise. Because the outside of the active element is cooled, there is a temperature gradient across it, with the highest temperatures occurring along it axis. Because the optical length of the active element varies with temperature, the result of the temperature gradient is to cause the active element to behave as if a positive lens were located at a central position. Such a lens will be referred to hereinafter as a thermally induced lens.

In a laser in which there is no compensation for the thermally induced lens, the beam divergence varies with input power. For many applications of a laser, the output beam from the oscillator stage can be coupled, in a satisfactory manner, into the next optical element by placing this next optical element at a suitable distance from the output mirror.

For some applications of a laser, it is required that the output beam is collimated. In order to obtain a collimated beam, it is known to include optical elements at fixed positions inside the cavity of the oscillator stage so as to compensate for the thermally induced lens. In some lasers, the average power of the pumping means can be varied so as to match the requirements of the operation being performed. This variation in average power causes a variation in the focal length of the thermally induced lens. Known arrangements for compensating for the thermally induced lens suffer from the disadvantage that they are designed to provide compensation at a particular average power of the pumping means.

Lasers have been proposed which have one or more amplifier stages following the oscillator stage. In such a laser, the thermally induced lens in the active element of the amplifier stage causes the output beam of the amplifier stage to converge. The angle of convergence varies with the average power of the pumping means associated with the amplifier stage. The convergence of the output beam of the amplifier, and more particularly variation in the angle of convergence, makes it difficult to couple the output beam of the amplifier stage into the next optical element.

SUMMARY OF THE INVENTION

Accordingly, it is an object of this invention to provide a new or improved laser having one or more optical stages, which are compensated for variations in the lens effect occurring in at least one optical stage.

According to this invention, there is provided a laser comprising at least one optical stage, the or each stage having an elongated active element formed from active material and means for pumping the active material, and the or at least one of the optical stages being provided with an individual telescope, wherein said telescope or each of said telescopes comprises a first lens arrangement and a second lens arrangement, the first lens arrangement and the active element of the associated optical stage being located relative to each other so that the apparent position of the thermally induced lens of the active element is located in a focal plane of the first lens arrangement, and the or each telescope is provided with means for adjusting the actual position of the second lens arrangement so as to compensate for variations in the average power of the pumping means of the associated optical stage.

In the laser of this invention, by arranging the or each telescope so that the apparent position of the thermally induced lens of the active element of the associated optical stage is located in a focal plane of the first lens arrangement, the lens system formed from this first lens arrangement and the thermally induced lens of the active element will have a constant focal length. By adjusting the position of the second lens arrangement so as to compensate for variations in the average power of the pumping means of the associated optical stage, there can be produced an output beam which is collimated and which also has a constant diameter despite variations in the average power of the pumping means.

BRIEF DESCRIPTION OF THE DRAWINGS

FIG. 6 is a layout diagram of a laser according to a third embodiment of this invention; FIG. 8 is a layout diagram of a laser according to a fifth embodiment of this invention.

DESCRIPTION OF THE PREFERRED EMBODIMENTS

Figure 1:
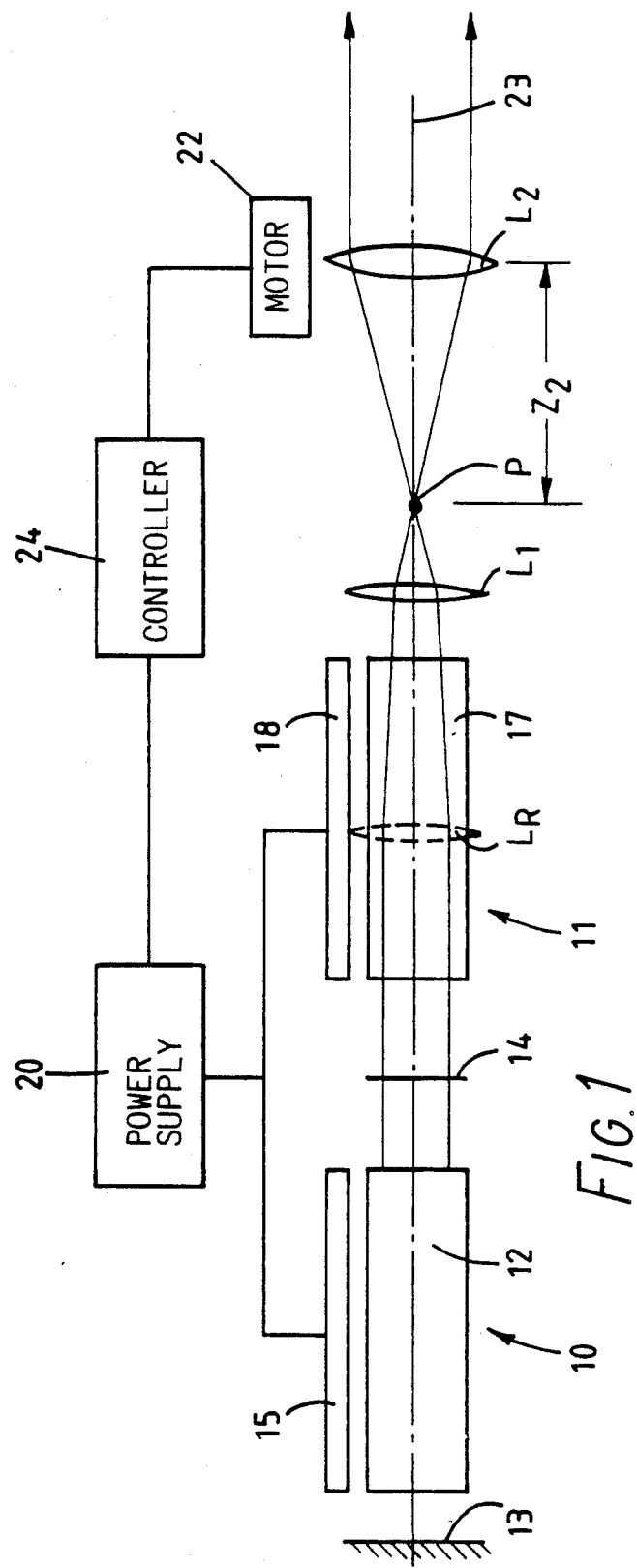
FIG. 1 is a layout diagram of a laser according to a first embodiment of this invention.

Referring now to FIG. 1, there is shown a laser comprising two optical stages in the form of an oscillator stage 10 and a single amplifier stage 11. The oscillator stage has an active element in the form of a rod 12 formed from active material and located between a fully reflecting mirror 13 and a partially reflecting output mirror 14. In the present example, the active material is yttrium aluminium garnet doped with neodymium (Nd:YAG). The rod 12 is pumped by a set of flashlamps, one of which is shown and indicated by reference numeral 15.

The amplifier stage 11 comprises an Nd:YAG rod 17 pumped by a set of flashlamps, one of which is shown and indicated by reference numeral 18.

The flashlamps 15 and 18 are connected to a power supply 20, which takes the form described in U.S. Pat. No. 4,276,497. As described in U.S. Pat. No. 4,276,497, the power supply 20 supplies the flashlamps 15, 18 with current pulses, the profile and duration of which may be varied. The duration of each pulse is usually greater than 0.1 ms. The duration and profile of the output light pulses of the laser follow approximately the duration and profile of the current pulses supplied to flashlamps 15,18.

Most of the light emitted by the flashlamps 15,18 and incident on the rods 12,17 is dissipated in these rods, thereby causing their temperature to rise. In the present example, the rods 12 and 17 are water cooled so as to remove the heat which is generated as a result of dissipation of the pumping light. As the light is absorbed throughout the rods 12 and 17 but heat is removed only from their outside surfaces, a temperature gradient is created in each of the rods, with the temperature being greatest along their axes. As the refractive index and the length of the rods vary with temperature, each rod behaves as a distributed lens. For reasons of simplicity this lens effect can be considered as if a single converging lens were located at its centre. In the case of the rod 17, this single converging lens is shown by dashed lines and indicated by reference letters $L_R$. The thermally induced lens $L_R$ in rod 17 causes the output beam of the amplifier stage 11 to converge. The focal length of the lens $L_R$, and consequently the degree of convergence of output beam of the amplifier stage 11, varies with the average power of flashlamps 18. In order to compensate for the lens $L_R$, the amplifier stage 11 is provided with a telescope formed from a pair of lenses $L_1$ and $L_2$.

As may be observed from FIG. 1, the rod 12, the rod 17 and the telescope formed from lenses $L_1$ and $L_2$ lie on a common optical axis 23.

Figure 2:
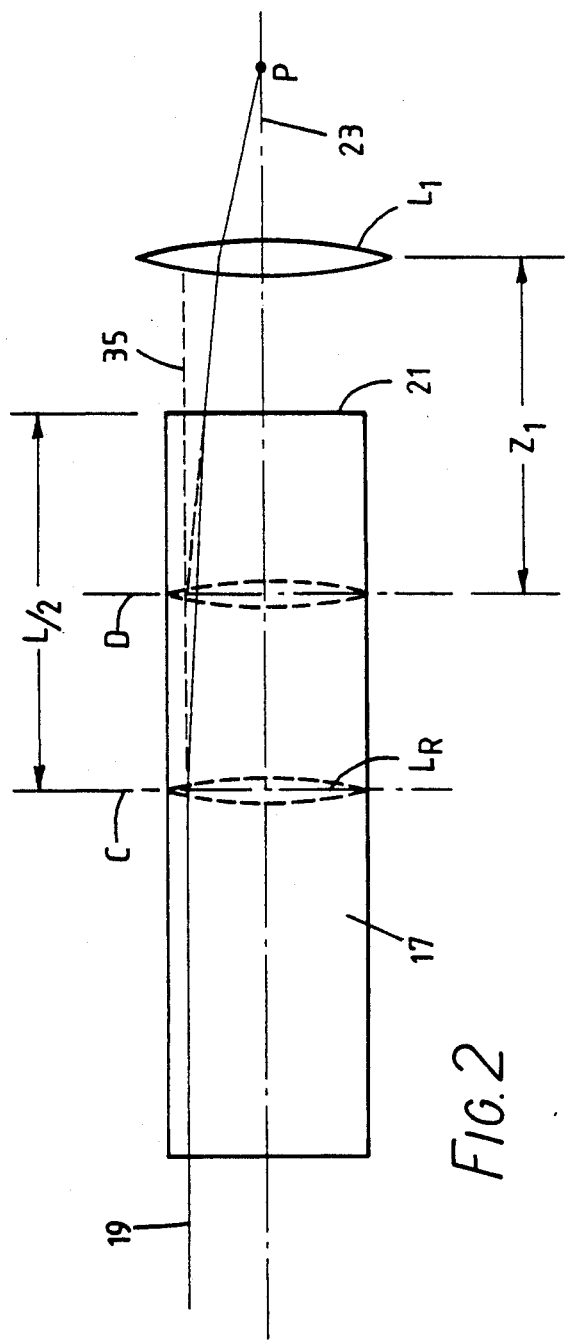
FIG. 2 is a ray diagram for illustrating the location of a lens component of a telescope forming part of the laser of FIG. 1.

Referring now to FIG. 2, there is shown a ray diagram illustrating the relationship between the rod 17 and the lens $L_1$. The rod 17 has a length L and the induced lens $L_R$ lies in a plane C passing through the middle of rod 17. FIG. 2 shows a ray 19 which travels initially through rod 17 along a path 35 parallel to axis 23. The ray is refracted at lens $L_R$, again at the end face 21 of rod 17, and again at lens $L_1$ and it is focussed at a point P on axis 23.

Viewed from lens $L_1$, the induced lens $L_R$ appears to lie in a plane D which is spaced axially from plane C. In other words, as a result of the refraction at end face 21, the induced lens $L_R$ appears to be shifted by the distance between planes C and D. The lens $L_R$ has a focal length $f_R$. However, viewed from lens $L_1$, the lens $L_R$ appears to have a focal length $F_R$ which is given by:

$$F_R = f_R/n \qquad (1)$$

where n is the refractive index of the material of rod 17. As shown in FIG. 2, the plane D is spaced from lens $L_1$ by a distance $Z_1$.

The focal length of the lens system formed from the lenses $L_R$ and $L_1$ is given by:

$$1/f = 1/F_R + 1/f_1 - Z_1/(F_R f_1) \qquad (2)$$

where $f_1$ is the focal length of the lens $L_1$.

As mentioned above, the focal length $f_R$, and hence the apparent focal length $F_R$, of the lens $L_R$ vary with the average power of the flashlamps 18. In order to prevent the focal length f varying with this average power, the distance $Z_1$ is set equal to the focal length $f_1$ of the lens $L_1$. Thus, the lens $L_1$ is located so that the apparent position of the thermally induced lens $L_1$ lies in the front focal plane of lens $L_1$. As a result of setting $Z_1$ equal to $f_1$, the first and third terms of the right hand side of equation (2) cancel, and so the focal length f is given by:

$$1/f = 1/f_1 \qquad (3)$$

Figure 3:
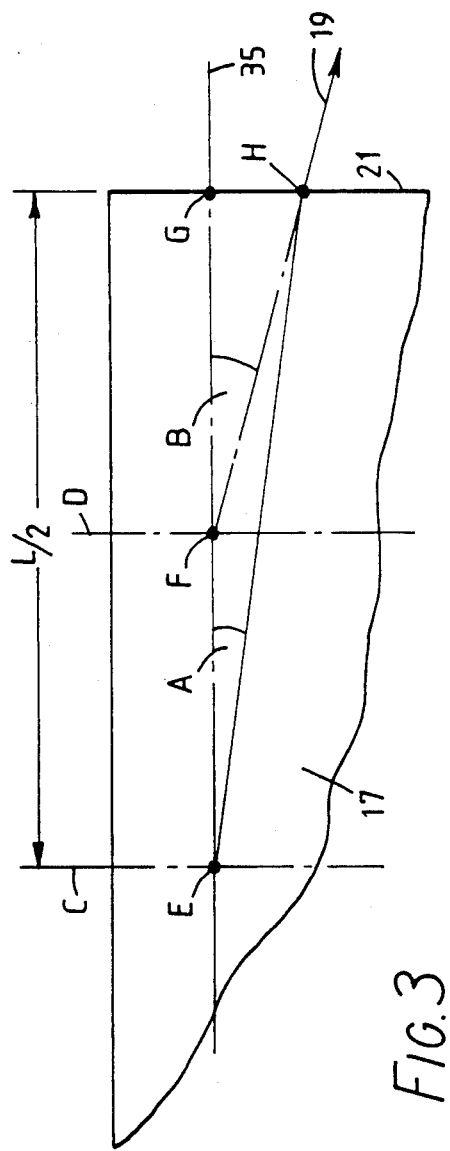
FIG. 3 is a ray diagram for determining the apparent position of a thermally induced lens.

The distance between planes C and D will now be derived with reference to FIG. 3. FIG. 3 shows the ray 19 passing through a fragment of rod 17.

As shown in FIG. 3, the ray 19 intercepts plane C at a point E where it is refracted through an angle A. The ray 19 intercepts the output face 21 at a point H. The path 35 intercepts the plane D at a point F and intercepts the output face 21 at a point G. Outside rod 17, the ray 19 forms an angle B with the path 35.

Assuming that angles A and B are small, the distance EF between the planes C and D, and hence between the actual and apparent positions of the induced lens $L_R$, can be derived as follows:

$$GH = FG \cdot B = A(L/2) \qquad (4)$$

so $$B/A = (L/2)FG \qquad (5)$$

From the law of refraction $$B/A = n \qquad (6)$$

Combining equation (5) and (6) gives $$FG = (L/2)/(n) \qquad (7)$$

Hence $$EF = (L/2) - FG = L(n-1)/2n \qquad (8)$$

Referring back to FIG. 1, as the focal length $f_R$ of lens $L_R$ varies, the position of the focal point P moves along the optical axis 23 of the laser. In order to allow for this movement, the lens $L_2$ is moved axially by a linear stepper motor 22 so as to maintain the distance $Z_2$ between the focal point P and the lens $L_2$ constant. In the present example, the position of lens $L_2$ is adjusted so that the focal point P is located in the front focal plane of lens $L_2$. Consequently, the output beam of the laser is collimated.

The motor 22 receives a control signal from a controller 24, and the controller 24 receives an input signal from the power supply 20. The details of controller 24 are shown in more detail in FIG. 4 and the controller 24 will now be described with reference to that figure.

Figure 4:
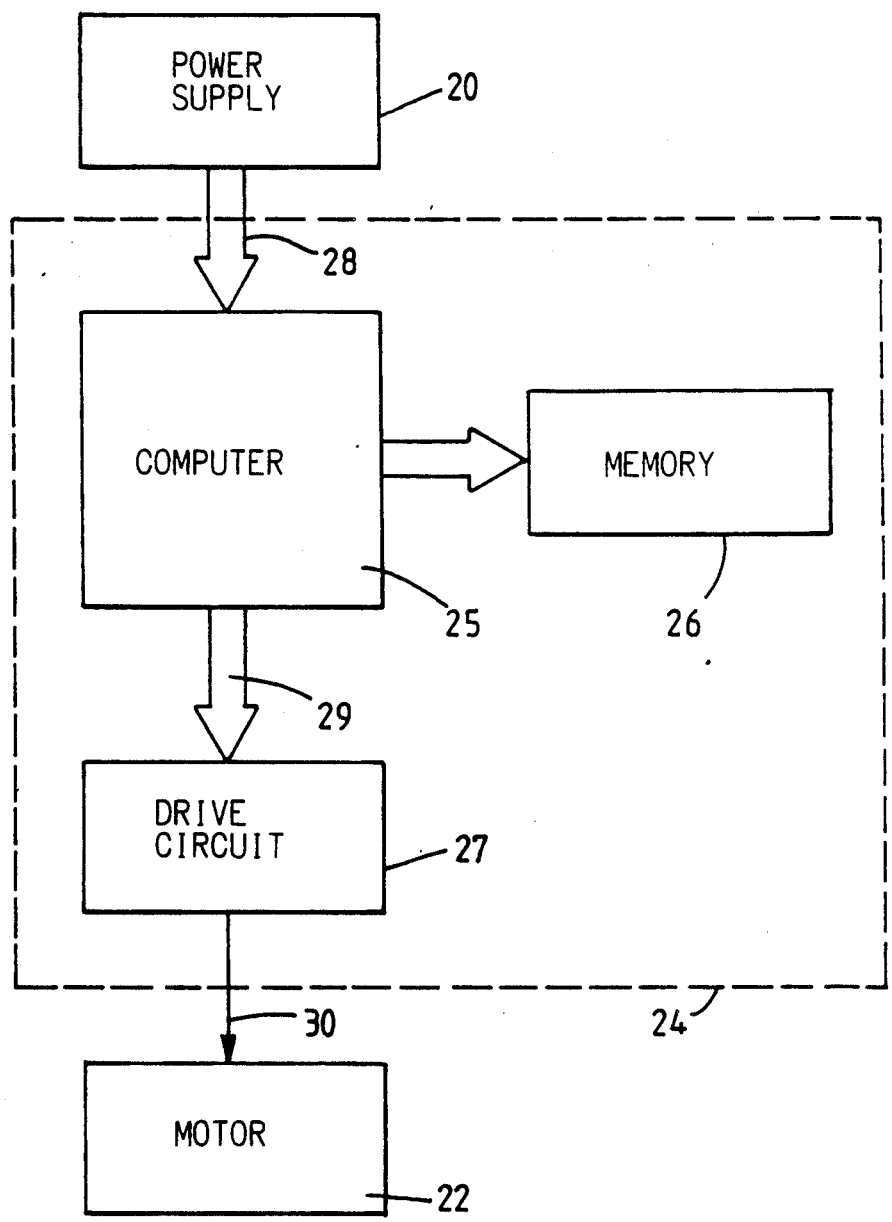
FIG. 4 is a block diagram of a controller for a motor forming part of the laser of FIG. 1.

Referring now to FIG. 4, controller 24 comprises a computer 25, a memory 26, and a drive circuit 27 for motor 22. The power supply 20 supplies a digital signal on a bus 28 to an input of computer 25. This digital signal is indicative of the prevailing average input power to flashlamps 18. The memory 26 contains a look-up table which sets out values for the position of lens $L_2$ as a function of the average power. The values for the look-up table can be derived by manually adjusting the position of lens $L_2$ for each of a set of average power values of the flashlamps 18 until a collimated beam is achieved and then noting the position of lens $L_2$. For the prevailing average power of flashlamps 18, the computer 25 retrieves the values corresponding to the required position for lens $L_2$ from memory 26. The required position is supplied as a digital signal on a bus 29 to drive circuit 27. The drive circuit 27 supplies power pulse on a line 30 to motor 22. The motor 22 adjusts the actual position of lens $L_2$ until it is the same as the required position. Thus, the controller 24 adjusts the position of lens $L_2$ of a function of the average power of flashlamps 18.

Because the focal length of the lens system formed from lenses $L_R$ and $L_1$ remains constant despite variations in the focal length of lens $L_R$, and because the position of lens $L_2$ is adjusted axially so that the focal point P lies in the front focal plane of lens $L_2$, the diameter of the output beam of lens $L_2$ also remains constant. Thus, in the laser shown in FIG. 1, there is produced an output beam which remains collimated with a constant beam diameter despite variations in the power of the flashlamp 18. This is achieved by adjusting the position of only one element, namely lens $L_2$.

For many applications, it is essential that the output beam of the laser remains collimated and with a constant beam diameter. In one application of a high power laser, the output beam of the laser is focused onto an input face of an optical fibre for transmission to a desired location. If the output beam of the laser becomes convergent, this can cause the beam to spill outwardly from the input face of the optical fibre, with the results that some of the beam will not be transmitted along the optical fibre and the outer parts of the fibre may be damaged.

In the example given above, the output beam of the laser is collimated and a collimated beam corresponds to the requirement of most applications of the laser shown in FIG. 1. However, for some applications, it may be required to make the beam divergent or convergent. This may be achieved by moving the focal point P towards, or away from, the lens $L_2$. In both cases, the distance between the focal point P and lens $L_2$ is maintained constant despite variations in the average power of flashlamps 18.

In the laser shown in FIG. 1, the thermally induced lens in the rod 12 causes the laser beam to converge between the end of rod 12 and the output mirror 14. At the output mirror, the rays of the laser beam are normal thereto. Beyond the output mirror 14, the laser beam diverges. In order to ensure that the laser beam has the same diameter at the input to rod 17 as it has at the output of rod 12, the mirror 14 is located mid-way between rods 12 and 17.

As described with reference to FIG. 1, the position of lens $L_2$ is adjusted as a function of the average power of flashlamps 18. By way of an alternative, there could be provided a sensor which detects whether the output beam of the laster is divergent, collimated or convergent and the sensor could then provide an output signal which is used by motor 22 to adjust the position of lens $L_2$ so as to achieve a collimated beam.

Although in the laser of FIG. 1, the rods 12 and 17 are each formed from Nd:YAG, other active material, for example, glass doped with neodymium (Nd:glass), could be used in place of Nd:YAG.

As mentioned above, the minimum pulse duration provided by the power supply 20 of the laser shown in FIG. 1 is 0.1 ms. With an output pulse having a duration equal to, or greater than, 0.1 ms, there is no danger that the beam at the focal point A will have sufficient instantaneous power density to breakdown the air. However, if the laser were modified so as to operate with pulses of a shorter duration, for example less than 100 ns, the resulting high power density at the focal point P could cause air breakdown. Pulses of this duration occur in Q-switched lasers. There will now be described with reference to FIG. 5 a Q-switched laser which is provided with a telescope in accordance with this invention, in which the telescope is arranged so as to avoid air breakdown.

Figure 5:
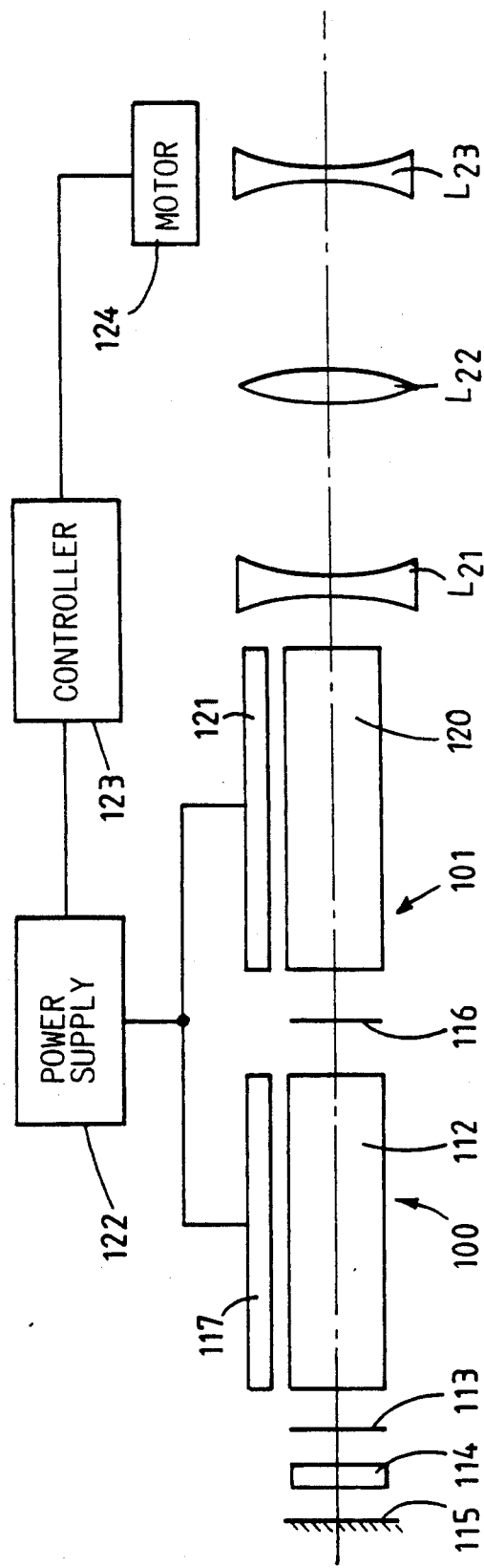
FIG. 5 is a layout diagram of a laser according to a second embodiment of this invention.

Referring now to FIG. 5, there is shown a Q-switched laser comprising an oscillator stage 100 and an amplifier stage 101. The oscillator stage 100 comprises a rod 112 formed from Nd:YAG, a polarizer 113, an electro-optic element 114, a fully reflecting mirror 115 and a partially reflecting output mirror 116. The rod 112 is pumped by a set of flashlamps, one of which is shown and indicated by reference numeral 117.

The amplifier stage 101 comprises a rod 120 formed from Nd:YAG and a set of flashlamps, one of which is shown and indicated by reference 121. The flashlamps 117 and 121 receive power from a power supply 122. There is also provided a circuit, not shown, for switching the electro-optic crystal 114 at desired instant of time.

The amplifier stage 101 is provided with a telescope comprising a bi-concave lens $L_{21}$, a bi-convex lens $L_{22}$ and a bi-concave lens $L_{23}$. The lenses $L_{21}$ and $L_{22}$ together form a lens system and this lens system is arranged so that the apparent position of the thermally induced lens in rod 120 is located in its front focal plane. Thus, the combined focal length of the lens which is induced in rod 120 and the lens system formed from lens $L_{21}$ and $L_{22}$ is constant and does not vary with the average power of flashlamps 121. The position of lens $L_{23}$ is adjusted axially by a motor 124 so as to obtain a collimated output beam despite variations in the average power of flashlamps 121. The motor 124 receives a control signal from a controller 123. The controller 123 receives a signal from power supply 122 indicative of the average power supplied to the flashlamps 121.

As may be readily appreciated, in the example shown in FIG. 5, the telescope formed from lenses $L_{21}$, $L_{22}$ and $L_{23}$ does not focus the output beam of amplifier stage 101 to a single point. Consequently, there is no danger of air breakdown.

Referring now to FIG. 6, there is shown another example of a laser according to this invention. The laser shown in FIG. 6 is generally similar to the laser shown in FIG. 1 and like parts have been denoted by like reference numerals and characters and a detailed description of these parts will not be given.

In the laser shown in FIG. 6, the telescope formed from lenses $L_1$ and $L_2$ and associated with the rod 17 is located between the rods 10 and 17. This is in contrast to the laser shown in FIG. 1 in which the telescope is arranged after the rod 17 in the direction of propagation of the output beam of the oscillator stage 10. The lens $L_1$ is arranged adjacent the rod 17 and the apparent position of the thermally induced lens in rod 17 is located in the rear focal plane of lens $L_1$. The lens $L_2$ is located between the oscillator stage 10 and lens $L_1$ and, as before, its axial position is adjusted by motor 22. The telescope formed from lenses $L_1$ and $L_2$ causes the input beam to rod 17 to diverge and this compensates for the induced lens $L_R$ in rod 17. The axial position of lens $L_2$ is adjusted so as to achieve a collimated output beam from rod 17.

Figure 7:
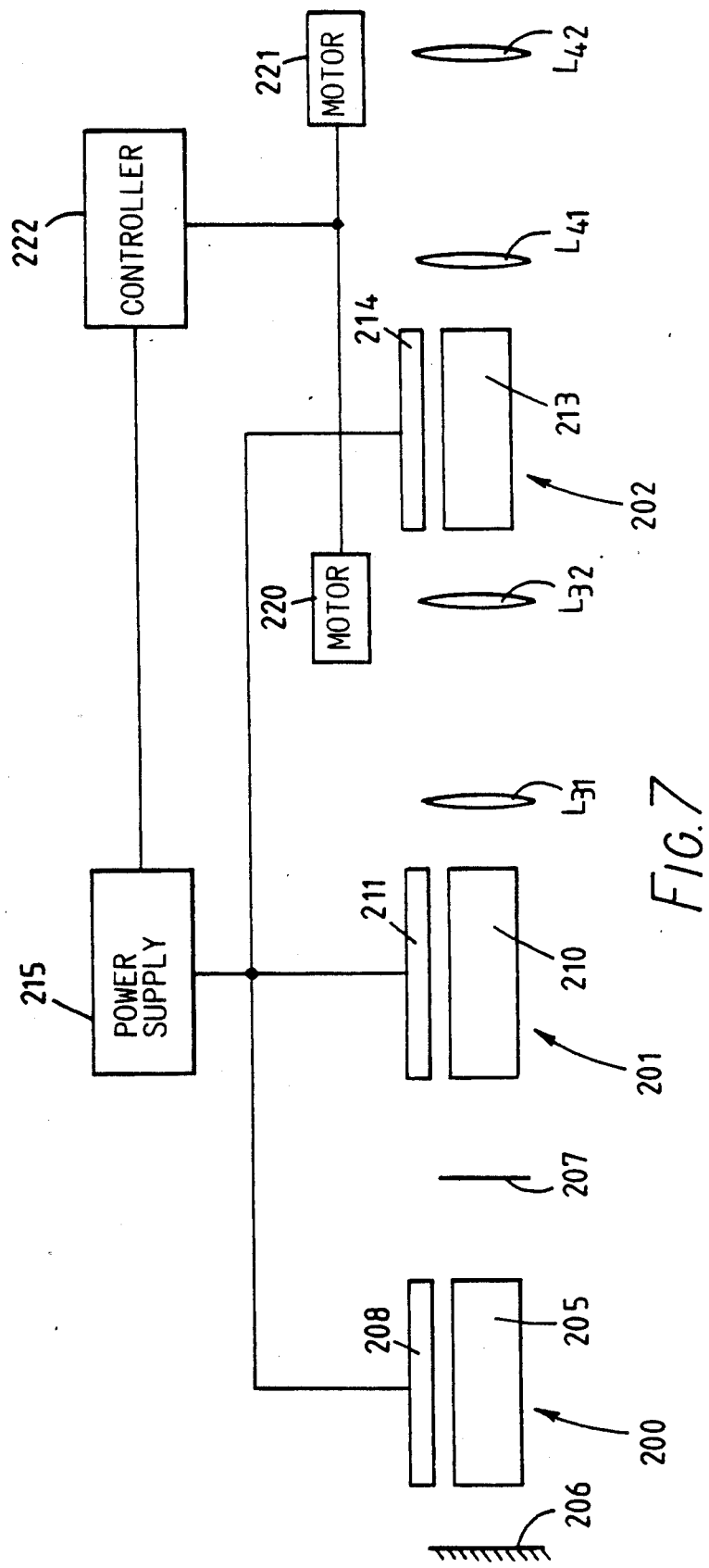
FIG. 7 is a layout diagram of a laser according to a fourth embodiment of this invention.

Referring now to FIG. 7, there is shown another example of a laser according to this invention. The laser shown in FIG. 7 comprises an oscillator stage 200, and a pair of amplifier stages 201 and 202.

The oscillator stage 200 has rod 205 formed from Nd:YAG, a fully reflecting mirror 206, a partially reflecting mirror 207 and a set of flashlamps one of which is shown indicated by reference numeral 208.

The first amplifier stage 201 has a rod 210 formed from Nd:YAG and a set of flashlamps one of which is shown and indicated by reference numeral 211. Similarly, the second amplifier stage 202 has a rod 213 formed from Nd:YAG and a set of flashlamps one of which is shown and indicated by reference numeral 214. The flashlamps 208, 211 and 214 receive power from a power supply 215.

The amplifier stage 201 is provided with a telescope formed from a pair of converging lenses $L_{31}$ and $L_{32}$. Likewise, the amplifier stage 213 is provided with a telescope formed from a pair of converging lenses $L_{41}$ and $L_{42}$. The operation of each of these telescopes is generally similar to the operation of the telescope formed from lenses $L_1$ and $L_2$ shown in FIG. 1. Thus, the apparent position of the thermally induced lens in rod 210 is located in the front focal plane of lens $L_{31}$ and the apparent position of the thermally induced lens in rod 213 is located in the front focal plane of lens $L_{41}$. The axial positions of lenses $L_{32}$ and $L_{42}$ are adjusted by motors 220 and 221. More specifically, the position of lens $L_{32}$ is adjusted so as to provide a collimated beam to the input of beam of rod 213 and the position of lens $L_{42}$ is adjusted so that the output beam of the laser is collimated.

The motors 220 and 221 receive control signals from a controller 222 and the controller 222 receives a signal from the power supply 215 indicative of the average power supplied to flashlamps 211 and 214.

Thus, in the example shown in FIG. 7, each amplifier stage is provided with a telescope to compensate for the lens effect occurring in its rod. By way of simplification, the telescope formed from lenses $L_{41}$ and $L_{42}$ could be omitted. This would result in the output beam from the laser not being collimated and, for some applications, this might be tolerable.

Referring now to FIG. 8, there is shown another example of a laser according to this invention. The laser of FIG. 8 has a single optical stage in the form of oscillator stage 300.

The oscillator stage 300 has a rod 301 formed from Nd:YAG, a fully reflecting mirror 302, a partially reflecting output mirror 303, and a set of flashlamps one of which is shown and indicated by reference numeral 305. The flashlamps receive power from a power supply 306. The components described so far are conventional and may be found, for example, in the type JK 701 laser available from Lumonics Ltd., Rugby, England.

In order to compensate for the thermally induced lens in rod 301, the oscillator stage 300 is provided with a telescope formed from lenses $L_{51}$ and $L_{52}$. The apparent position of the induced lens in rod 301 is located on the front focal plane of lens $L_{51}$. The axial position of lens $L_{52}$ is adjusted by a motor 307 so that the laser beam is collimated between lens $L_{52}$ and mirror 303. Consequently, the output beam is also collimated. The motor 307 receives a control signal from a controller 308 which receives a signal from power supply 306 indicating the average power of lamps 305.

We claim:

1. A laser having a resonant cavity and means for supplying an optical output, said laser comprising at least one optical stage having an elongated active element formed from active material, and means for pumping the active material, and wherein at least one optical stage is provided with an individual telescope, wherein said telescope comprises a first lens arrangement and a second lens arrangement, the first lens arrangement and the active element of said associated optical stage being located relative to each other so that the apparent position of a thermally induced lens of the active element is located in a focal plane of the first lens arrangement, and said telescope is provided with means for adjusting the actual position of the second lens arrangement so as to compensate for variations in the average power of the pumping means of the said associated optical stage.

2. A laser as claimed in claim 1, wherein, in said telescope, the position of the second lens arrangement is adjusted so as to form a collimated beam.

3. A laser as claimed in claim 1, wherein, in said telescope, the position of the second lens arrangement is adjusted as a function of the average power of the pumping means of said associated optical stage.

4. A laser as claimed in claim 1 wherein, in said telescope, the first lens arrangement comprises a single converging lens and the second lens arrangement comprises a single converging lens.

5. A laser as claimed in claim 1, wherein, in said telescope, the first lens arrangement comprises a lens system formed from a single diverging lens and a single converging lens, and the second lens arrangement comprises a single diverging lens.

6. A laser as claimed in claim 1, wherein said telescope is located immediately after the active element of its associated optical stage in the direction of propagation of the output beam of the laser.

7. A laser as claimed in claim 1, comprising a single oscillator stage, a single amplifier stage, and a single telescope associated with said single amplifier stage.

8. A laser as claimed in claim 1, comprising a single oscillator stage, two amplifier stages, and two telescopes each of which is associated with a respective one of the amplifier stages.

9. A laser as claimed in claim 1, comprising a single optical stage in the form of an oscillator stage, and a single telescope associated with the oscillator stage.

10. A laser as claimed in claim 1, wherein the active material of said at least one optical stage is yttrium aluminum garnet doped with neodymium.

11. A laser as claimed in claim 2, wherein in said telescope, the position of the second lens arrangement is adjusted as a function of the average power of the pumping means of said associated optical stage.

* * * * *